United States Patent
Katougi et al.

(10) Patent No.: US 9,339,882 B2
(45) Date of Patent: May 17, 2016

(54) CLEANING DEVICE FOR ELECTRICAL-DISCHARGE MACHINING FLUID AND CLEANING METHOD FOR ELECTRICAL-DISCHARGE MACHINING FLUID

(75) Inventors: Hidetaka Katougi, Tokyo (JP); Hirokazu Kobayashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/410,974

(22) PCT Filed: Jul. 2, 2012

(86) PCT No.: PCT/JP2012/066893
§ 371 (c)(1),
(2), (4) Date: Dec. 23, 2014

(87) PCT Pub. No.: WO2014/006672
PCT Pub. Date: Jan. 9, 2014

(65) Prior Publication Data
US 2015/0336193 A1 Nov. 26, 2015

(51) Int. Cl.
*B23H 1/10* (2006.01)
*B01D 24/10* (2006.01)
(Continued)

(52) U.S. Cl.
CPC *B23H 1/10* (2013.01); *B01D 24/10* (2013.01); *B01D 35/26* (2013.01); *B23H 7/36* (2013.01)

(58) Field of Classification Search
CPC ............ B23H 1/10; B23H 7/36; B01D 35/26; B01D 24/10
See application file for complete search history.

(56) References Cited

U.S. PATENT DOCUMENTS

| 6,290,848 B1 | 9/2001 | Tanner et al. |
| 2002/0005377 A1 | 1/2002 | Tanner et al. |

FOREIGN PATENT DOCUMENTS

| JP | 51-133863 A | 11/1976 |
| JP | 52-033170 A | 3/1977 |
| JP | 56-163844 A | 12/1981 |

(Continued)

OTHER PUBLICATIONS

International Search Report for PCT/JP2012/066893 dated Oct. 2, 2012 [PCT/ISA/210].

(Continued)

*Primary Examiner* — Chester Barry
(74) *Attorney, Agent, or Firm* — Sughrue Mion, PLLC; Richard C. Turner

(57) ABSTRACT

The present invention relates to a cleaning device for electrical-discharge machining fluid that cleans electrical-discharge machining fluid of an electrical-discharge machining device including a machining tank that is filled with the oil-based electrical-discharge machining fluid and in which a workpiece is machined by applying a pulse voltage between the workpiece and a machining electrode and a machining-fluid storage tank storing the electrical-discharge machining fluid to be used in the machining tank, the cleaning device including a cleaning-material storage container, which stores a cleaning material made of a granular porous material having a specific gravity equal to or higher than that of the electrical-discharge machining fluid and a grain diameter between 0.01 millimeters and 10 millimeters, in a flow channel that causes the electrical-discharge machining fluid to flow between the machining tank and the machining-fluid storage tank.

11 Claims, 5 Drawing Sheets

(51) Int. Cl.
  *B01D 35/26* (2006.01)
  *B23H 7/36* (2006.01)

(56) References Cited

FOREIGN PATENT DOCUMENTS

| JP | 57-001620 A | 1/1982 |
| JP | 60-135483 A | 7/1985 |
| JP | 62-297020 A | 12/1987 |
| JP | 63-002620 A | 1/1988 |
| JP | 63-306823 A | 12/1988 |
| JP | 01-099518 A | 4/1989 |
| JP | 10-113506 A | 5/1998 |
| JP | 10-202022 A | 8/1998 |
| JP | 11-292773 A | 10/1999 |
| JP | 2001-520572 A | 10/2001 |
| JP | 2001-335793 A | 12/2001 |
| JP | 2001-342488 A | 12/2001 |
| JP | 2005-103709 A | 4/2005 |
| JP | 2007-105863 A | 4/2007 |
| JP | 2007-276021 A | 10/2007 |
| JP | 2009-006268 A | 1/2009 |
| JP | 2010-265335 A | 11/2010 |

OTHER PUBLICATIONS

Notice of Rejection for 2012-551418 dated Feb. 12, 2013.

FIG.6

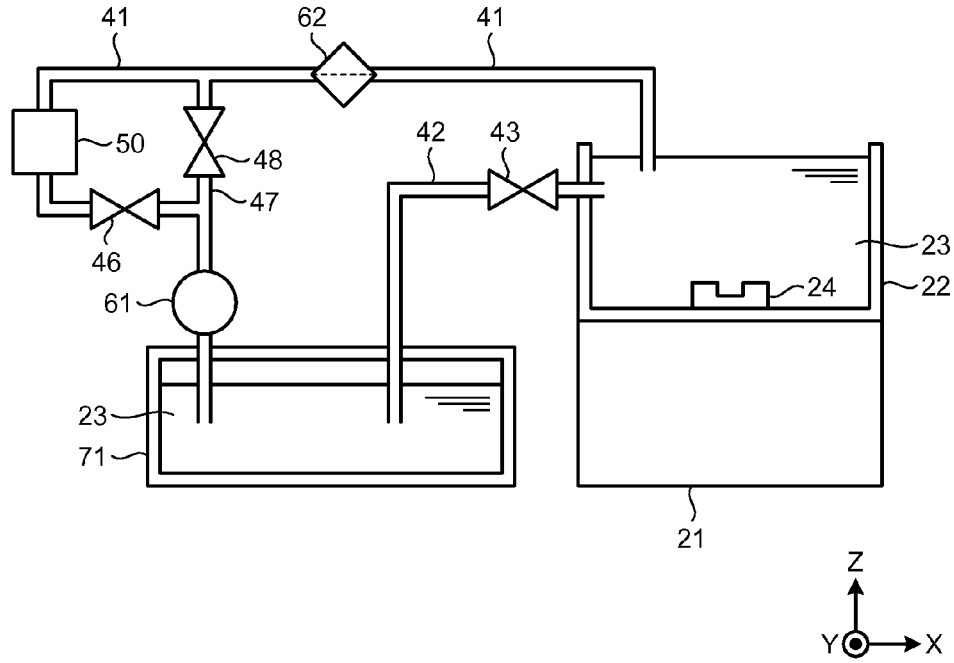

FIG.7

| | | EXAMPLE 1 | EXAMPLE 2 | EXAMPLE 3 |
|---|---|---|---|---|
| CLEANING MATERIAL | MATERIAL | ACTIVATED CARBON | ACTIVATED WHITE EARTH | |
| | GRAIN SIZE [mm] | 0.2~0.5 | 0.2~0.8 | |
| | SPECIFIC GRAVITY | 1.8~2.5 | 2.4 | |
| | USED AMOUNT [kg] | 10 | | |
| TOTAL AMOUNT OF ELECTRICAL-DISCHARGE MACHINING FLUID [l] | | 200 | | |
| PASSAGE TIME IN CLEANING DEVICE [h] | | 720 | 24 | 120 |
| ELECTRICAL-DISCHARGE MACHINING FLUID BEFORE CLEANING | COLOR (SAYBOLT) | -16 | JIS-K-2580 | |
| | DENSITY [g/cm$^3$] | 0.806 | JIS-K-2249 | |
| | VISCOSITY [mm$^2$/s] @40 deg | 4.0 | JIS-K-2283 | |
| | WATER CONTENT [mass%] | <0.03 | JIS-K-2275 | |
| | ACID VALUE [mgKOH/g] | 0.02 | JIS-K-2501 | |
| | DEGREE OF CONTAMINATION [mg/100 ml] | 0.2 | JIS-B-9931 | |

FIG.8

| | | NEW OIL | BEFORE CLEANING | EXAMPLE 1, ACTIVATED CARBON, 720[h] | EXAMPLE 2, ACTIVATED WHITE EARTH, 24[h] | EXAMPLE 3, ACTIVATED WHITE EARTH, 120[h] |
|---|---|---|---|---|---|---|
| ELECTRICAL-DISCHARGE MACHINING FLUID BEFORE CLEANING | COLOR (SAYBOLT) | 30 | <-16 | <-16 | 19 | 20 |
| | DENSITY [g/cm$^3$] | 0.769 | 0.806 | 0.805 | 0.804 | 0.804 |
| | VISCOSITY [mm$^2$/s] @ 40 DEG | 2.4 | 4.0 | 3.6 | 3.6 | 3.6 |
| | WATER CONTENT [mass%] | <0.03 | <0.03 | <0.03 | <0.03 | <0.03 |
| | ACID VALUE [mgKOH/g] | 0.00 | 0.02 | 0.01 | 0.01 | 0.01 |
| | DEGREE OF CONTAMINATION [mg/100 ml] | 0.0 | 0.2 | 0.1 | 0.1 | 0.1 |

FIG.9

| | BEFORE CLEANING | | EXAMPLE 2, AFTER CLEANING | |
|---|---|---|---|---|
| | RIB MACHINING 20 mm | □10 BEST SURFACE MACHINING | RIB MACHINING 20 mm | □10 BEST SURFACE MACHINING |
| MACHINING TIME | 3:20:12 | 0:55:19 | 2:47:25 | 0:55:20 |
| SURFACE ROUGHNESS Rz | 6.8 μm | 0.335 μm | 7.0 μm | 0.333 μm |
| NOTE | SURFACE IRREGULARITIES CONFIRMED | SURFACE IRREGULARITIES CONFIRMED | NO PROBLEM CONFIRMED | NO PROBLEM CONFIRMED |

CLEANING DEVICE FOR ELECTRICAL-DISCHARGE MACHINING FLUID AND CLEANING METHOD FOR ELECTRICAL-DISCHARGE MACHINING FLUID

CROSS REFERENCE TO RELATED APPLICATIONS

This application is a National Stage of International Application No. PCT/JP2012/066893 filed Jul. 2, 2012, the contents of all of which are incorporated herein by reference in their entirety.

FIELD

The present invention relates to a cleaning device for electrical-discharge machining fluid and a cleaning method for electrical-discharge machining fluid.

BACKGROUND

In electrical-discharge machining, in which electrical discharge is generated between a machining electrode and a workpiece facing each other (hereinafter, "gap") and machining proceeds by melting and removing the workpiece by the generated thermal energy, water-based and oil-based machining fluid have been used for cooling of the electrical discharge point and ion quenching and dielectric recovery after generation of electrical discharge.

In an electrical-discharge machining device using water-based machining fluid, especially pure water, a filter device that separates machining debris, an ion-exchange resin that maintains the specific resistance of the electrical-discharge machining fluid, and the like are provided in order to clean the electrical-discharge machining fluid.

In an electrical-discharge machining device using oil-based machining fluid, a filter device that separates machining debris is also provided. For example, a filter device that uses grain-refined activated white earth as a machining-debris adhering agent is known (for example, see Patent Literature 1). It is known that, in order to stabilize the electrical discharge state by reducing the generated amount of metal machining debris in the oil-based machining fluid or decreasing the particle size, a metal complex is formed by adding a complexing agent to oil-based machining fluid. A technique has been proposed in which a molecular sieve for removing water that separates the complexing agent and oil content in the oil-based machining fluid is provided, thereby improving the electrical discharge performance (for example, see Patent Literature 2). However, a device that maintains the specific resistance of the electrical-discharge machining fluid in the electrical-discharge machining device that uses oil-based machining fluid has not been considered heretofore, and such a device has not been proposed yet.

CITATION LIST

Patent Literatures

Patent Literature 1: Japanese Patent Application Laid-open No. S51-133863

Patent Literature 2: Japanese Patent Application Laid-open No. 2007-105863

SUMMARY

Technical Problem

Patent Literature 1 describes an invention related to a maintenance method of a filter device that has been achieved to solve such a problem that when grain-refined activated white earth is used as a machining-debris adhering agent, the activated white earth is turned into gel, slurry, or sludge that causes clogging of the filter device. Particularly, it is indicated that the grain-refined activated white earth not only makes handling such as replacement difficult but also reduces the flowability of the electrical-discharge machining fluid, and in some cases, the grain-refined activated white earth may enter the gap during electrical discharge machining. Further, the activated white earth having turned into sludge due to grain refinement is separated from the electrical-discharge machining fluid, and thus the function of suppressing immixing of water and oxidation cannot be obtained. Therefore, Patent Literature 1 does not focus attention on the progress of immixing of water and oxidation of the electrical-discharge machining fluid depending on the duration of use, the environment, and the use status.

In Patent Literature 2, a molecular sieve is provided in order to separate water. However, the object of the invention is to add the complexing agent in order to improve the performance of the electrical-discharge machining fluid. Further, because water or an aqueous solution is used to separate the complexing agent and the electrical-discharge machining fluid, it is not recognized that immixing of water and oxidation of the electrical-discharge machining fluid proceed depending on the duration of use, the environment, and the use status. That is, the molecular sieve is not provided in order to clean the electrical-discharge machining fluid.

Generally, for dehydration, deoxidation, and decoloration of oils and fats, a porous material such as activated white earth, acid clay, activated carbon, alumina, and silica gel is used. Conventionally, however, a technique has not been proposed specifically for cleaning the electrical-discharge machining fluid of an electrical-discharge machining device, particularly, the electrical-discharge machining fluid in which immixing of water and oxidation have occurred depending on the duration of use, the environment, and the use status. Further, a filter device that separates machining debris has been generally used for oil-based machining fluid. However, there is no device that maintains the specific resistance of the electrical-discharge machining fluid, and during the long-term use of the electrical-discharge machining fluid, addition of machining fluid during an arbitrary period or full-replacement of electrical-discharge machining fluid during an arbitrary period has been performed. In all cases, the performance of the electrical-discharge machining fluid has not been maintained or controlled, and has been left to the sensory judgment of the operator based on, for example, viscosity and hue change. Particularly, when the oil-based machining fluid contains an additive for adjusting constituents, the electrical-discharge machining fluid that is colorless and transparent in a new-oil state changes from yellow to red as it deteriorates, and when the electrical-discharge machining fluid contains water, the electrical-discharge machining fluid changes to a creamy white color, and thus the operator visually checks the change in color and determines the deterioration thereof.

The present invention has been achieved in view of the above problems, and an object of the present invention is to provide a cleaning device for electrical-discharge machining fluid that cleans oil-based electrical-discharge machining fluid that is used in electrical discharge machining and is deteriorated due to the progress of immixing of water and oxidation depending on the duration of use, the environment, and the use status, and to provide a cleaning method for electrical-discharge machining fluid.

Solution to Problem

In order to achieve the above object, a cleaning device for electrical-discharge machining fluid according to the present invention relates to a cleaning device for electrical-discharge machining fluid that cleans electrical-discharge machining fluid of an electrical-discharge machining device including a machining tank that is filled with oil-based electrical-discharge machining fluid and in which a workpiece is machined by applying a pulse voltage between the workpiece and a machining electrode and a machining-fluid storage tank that stores the electrical-discharge machining fluid to be used in the machining tank, the cleaning device including: a cleaning-material storage container in a flow channel that causes the electrical-discharge machining fluid to flow between the machining tank and the machining-fluid storage tank, the cleaning-material storage container storing a cleaning material, which is made of a granular porous material having a specific gravity equal to or higher than that of the electrical-discharge machining fluid and a grain diameter between 0.01 millimeters and 10 millimeters.

Advantageous Effects of Invention

According to the present invention, a cleaning-material storage container, which stores a cleaning material made of a granular porous material having a specific gravity equal to or higher than that of the electrical-discharge machining fluid and a grain diameter between 0.01 millimeters and 10 millimeters, is arranged in a flow channel that causes the electrical-discharge machining fluid to flow between a machining tank and a machining-fluid storage tank. Accordingly, dehydration and deoxidation of oils and fats from the electrical-discharge machining fluid are performed to clean the electrical-discharge machining fluid. As a result, an effect is obtained where the performance of the electrical discharge machining can be maintained and improved.

BRIEF DESCRIPTION OF DRAWINGS

FIG. 6 is a diagram schematically showing an example of the configuration of an electrical-discharge machining device including a cleaning device for electrical-discharge machining fluid according to a fifth embodiment.

FIG. 7 is a diagram showing test conditions used in examples.

FIG. 8 is a diagram showing characteristics of new oil, machining fluid before cleaning, and machining fluid after being subjected to a cleaning process in Examples 1 to 3.

FIG. 9 is a diagram showing results of an electrical-discharge machining test performed by using machining fluid before cleaning and machining fluid after being subjected to the cleaning process in Example 2.

DESCRIPTION OF EMBODIMENTS

Preferable embodiments of a cleaning device for electrical-discharge machining fluid and a cleaning method for electrical-discharge machining fluid according to the present invention will be explained below in detail with reference to the accompanying drawings. The present invention is not limited to the embodiments.

First Embodiment

Figure 1:
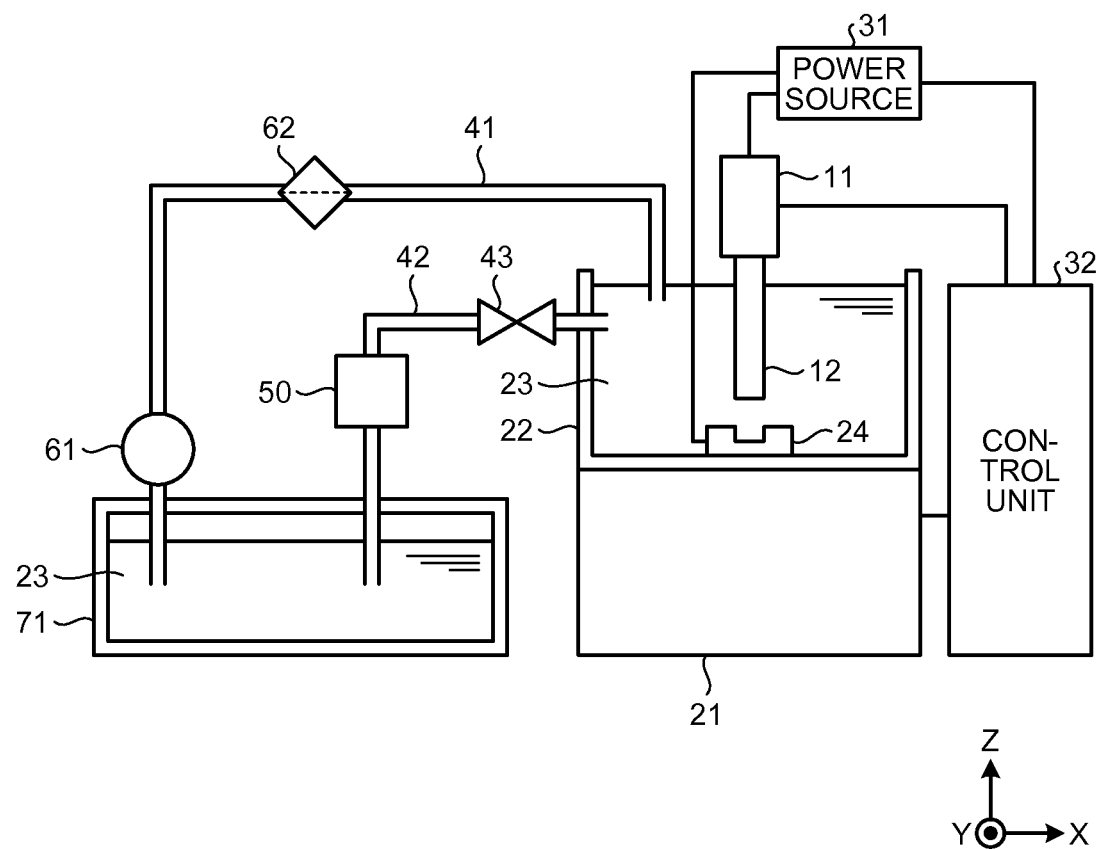
FIG. 1 is a diagram schematically showing an example of the configuration of an electrical-discharge machining device including a cleaning device for electrical-discharge machining fluid according to a first embodiment.
Figure 2:
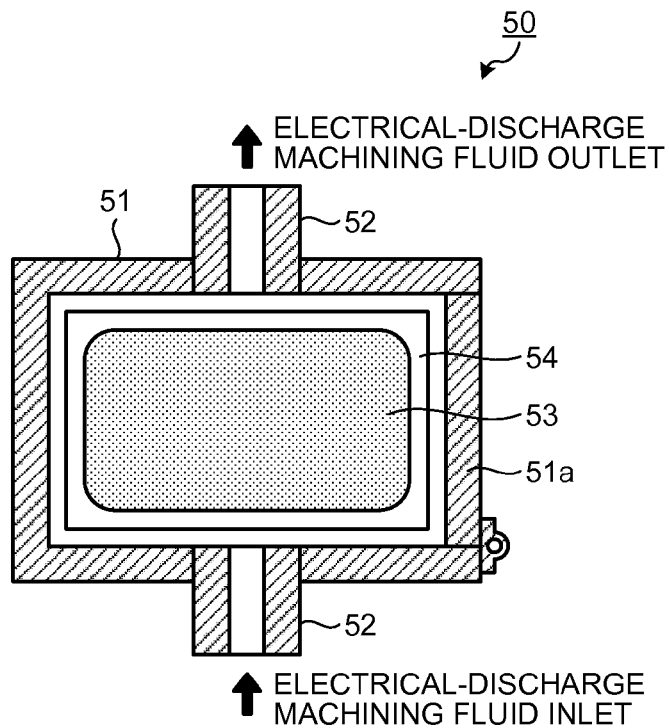
FIG. 2 is a cross-sectional view schematically showing an example of the configuration of the cleaning device for electrical-discharge machining fluid according to the first embodiment.

FIG. 1 is a diagram schematically showing an example of the configuration of an electrical-discharge machining device including a cleaning device for electrical-discharge machining fluid according to a first embodiment. FIG. 2 is a cross-sectional view schematically showing an example of the configuration of the cleaning device for electrical-discharge machining fluid according to the first embodiment. In FIG. 1, an X axis and a Y axis, which are orthogonal to each other, are set on the plane where a workpiece 24 is mounted, and the direction (height direction) vertical to both the X axis and the Y axis is designated as a Z-axis direction.

The electrical-discharge machining device includes a main shaft 11 driven in the Z-axis direction, a worktable 21 driven in the XY direction, and a machining tank 22 installed on the worktable 21. A machining electrode 12 is attached to the main shaft 11. The machining tank 22 is filled with oil-based electrical-discharge machining fluid (hereinafter, simply "machining fluid" in some cases) 23. In the machining tank 22, the workpiece 24 is arranged such that the machining electrode 12 and the workpiece 24 are arranged facing each other with a predetermined machining gap therebetween in the machining fluid 23. A power source 31 that applies a voltage between the workpiece 24 and the machining electrode 12 at the time of the electrical discharge machining is connected to the workpiece 24 and the machining electrode 12. A control unit 32 is connected to the main shaft 11 and the worktable 21. The control unit 32 controls the positions of the main shaft 11 and the worktable 21 according to an electrical-discharge machining program and controls on/off of power supply of the power source 31 to perform an electrical-discharge machining process.

The electrical discharge machining includes diesinking electrical discharge machining in which the machining electrode 12 transfers a desired shape to the workpiece 24 and wire electrical discharge machining in which the machining electrode 12 is a wire and bores the workpiece 24 into a desired shape like a jig saw. The following embodiments can be applied to a case where the machining fluid 23 is oil-based machining fluid, regardless of the diesinking electrical discharge machining or the wire electrical discharge machining.

A machining-fluid storage tank 71 is provided to the machining tank 22 via pipes 41 and 42. The machining-fluid storage tank 71 supplies the machining fluid 23 into the machining tank 22 and stores the machining fluid 23 from the machining tank 22. The machining-fluid storage tank 71 includes the pipe 41 through which the machining fluid 23 is supplied to the machining tank 22 and the pipe 42 that receives the machining fluid 23 from the machining tank 22.

The pipe 41 is provided with a supply pump 61 that pumps up the machining fluid 23 in the machining-fluid storage tank 71 to supply the machining fluid 23 to the machining tank 22 and a filter unit 62 that separates machining debris in the machining fluid 23. The pipe 42 is provided with a discharge valve 43 that switches between discharge/non-discharge of the machining fluid 23 from the machining tank 22 and a cleaning unit 50 as the cleaning device for electrical-discharge machining fluid that cleans the machining fluid 23 discharged from the machining tank 22. The filter has a configuration via the supply pump 61 as shown in FIG. 1 and a configuration adopting a filter pump dedicated to the filter. However, because the configuration is not largely different in any case, the present embodiment explains taking the example of the former configuration.

As shown in FIG. 2, the cleaning unit 50 includes a box-like housing 51 that is hollow inside and a cleaning material 53 that cleans the oil-based machining fluid 23 with which the housing 51 is filled. A pipe-like joint 52 is provided at the positions of the housing 51 at which the housing 51 is connected to the pipe 42. The housing 51 is detachable from the pipe 42 by having such a structure including the joints 52. The cleaning material 53 is placed in a cleaning-material holding container 54 such as a mesh bag or container where the mesh has a diameter smaller than the grain diameter of the material to be used, and is stored such that the inside space of the housing 51 is filled with the cleaning material 53.

The cleaning unit 50 can be detached every time it is used. However, as shown in FIG. 2, by having an opening/closing door 51a for replacing the cleaning-material holding container 54, only the cleaning material 53 can be replaced while the cleaning unit 50 itself is arranged on the pipe 42.

As the cleaning material 53, it is possible to use a granular porous material capable of performing dehydration, deoxidization, and decoloration on the machining fluid 23, having a specific gravity equal to or higher than the specific gravity (about 2.0) of the machining fluid 23, and having a grain diameter between about 0.01 millimeters and 10 millimeters, preferably, between 0.2 millimeters and 5.0 millimeters. As such a porous material, activated white earth/acid clay, activated carbon, alumina, silica gel, and the like can be exemplified. If the specific gravity thereof is lower than the specific gravity of the machining fluid 23, the cleaning material 53 comes in contact with the machining fluid 23 and is turned into gel, slurry, or sludge, which is not desirable. If the grain diameter is smaller than 0.01 millimeters, the cleaning material 53 may flow out of the cleaning unit 50, and further, machining debris may be adsorbed on the cleaning material 53 and turned into gel, slurry, or sludge, which is not desirable. If the grain diameter is equal to or larger than 10 millimeters, the gap between grains becomes large to increase the ratio of the machining fluid 23 flowing between the grains, thereby decreasing the cleaning efficiency of the machining fluid 23, which is not desirable. Accordingly, as described above, by using the granular material having a grain diameter between about 0.01 millimeters and 10 millimeters and having a specific gravity equal to or higher than the specific gravity of the machining fluid 23, the cleaning material 53 is not turned into gel, slurry, or sludge when being present in the machining fluid 23, does not impair the flowability of the machining fluid 23, and is not suspended in the machining fluid 23, which are desirable.

The size of the machining debris generated in the electrical discharge machining in general use is between about several nanometers and 0.03 millimeters in the case of finish machining and is between about 0.03 millimeters and 0.1 millimeters in the case of rough machining. When the grain diameters of the machining debris and the cleaning material 53 have a difference of double or more, it can be considered that the binding force therebetween is small. As a result, the machining debris may be adsorbed on the cleaning material 53; however, the possibility that the cleaning material 53 is turned into gel, slurry, or sludge is extremely small. Accordingly, the cleaning material 53 with the grain diameter and the like being optimized depending on the type of the electrical-discharge machining process (finish machining, rough machining, or the like) may be used.

In this manner, the cleaning material 53 according to the first embodiment aims at cleaning the machining fluid 23, and more specifically, suppressing immixing of water and oxidation due to a change over time of the machining fluid 23. Therefore, the cleaning material 53 according to the first embodiment is neither the machining-material adhesive agent to which machining debris is attached as disclosed in Patent Literature 1 nor the material that intentionally separates water added to the machining fluid 23 as disclosed in Patent Literature 2. In view of these points, the cleaning unit 50 according to the first embodiment is different from those described in Patent Literatures 1 and 2.

An electrical-discharge machining method and a cleaning method for the machining fluid 23 will be explained next. It is assumed that the machining tank 22 is not filled with the machining fluid 23 before the electrical-discharge machining process is performed. Before the electrical-discharge machining process is performed, or by an arbitrary control set to the control unit 32 or by an arbitrary operation by the operator, the discharge valve 43 provided on the pipe 42 is changed to a "closed" state, and the supply pump 61 is activated to pump up the machining fluid 23 stored in the machining-fluid storage tank 71, thereby supplying the machining fluid 23 to the machining tank 22. At this point, the machining debris in the machining fluid 23 in the machining-fluid storage tank 71 is removed by the filter unit 62. When the machining tank 22 is filled with a predetermined amount of the machining fluid 23, the supply pump 61 is stopped.

Thereafter, the electrical-discharge machining process is performed. In the electrical discharge machining, in a state where the machining electrode 12 and the workpiece 24 are immersed in the machining tank 22 filled with the machining fluid 23, the position of the workpiece 24 in the XY direction and the position of the machining electrode 12 in the Z-axis direction are controlled respectively by the worktable 21 and the main shaft 11 such that the workpiece 24 and the machining electrode 12 are arranged to have a predetermined gap therebetween. Instantaneous arc discharge is repeatedly generated between the machining electrode 12 and the workpiece 24 by applying a pulse voltage in the order of microseconds to milliseconds between the machining electrode 12 and the workpiece 24 such that, for example, the machining electrode 12 becomes a positive electrode and the workpiece 24 becomes a negative electrode, and the surface to be machined of the workpiece 24 is melted and evaporated by arc heat generated at this time to perform removal processing. Simultaneously, the machining electrode 12 is moved downward by a servo mechanism. The shape of the machining surface of the machining electrode 12 is transferred to the workpiece 24 by continuously repeating this process. When the electrical discharge machining is being performed, the machining fluid 23 does not pass through the discharge valve 43, and thus the cleaning unit 50 does not clean the machining fluid 23.

After completion of the electrical-discharge machining process, or by an arbitrary control set to the control unit 32 or by an arbitrary operation by the operator, the discharge valve 43 provided on the pipe 42 is changed to an "open" state, and the machining fluid 23 is discharged from the machining tank 22 to the machining-fluid storage tank 71. At this point, dehydration, deoxidization, and decoloration are performed on the machining fluid 23 in the cleaning unit 50, and the machining fluid 23 in the machining tank 22 is discharged to the machining-fluid storage tank 71 in a cleaned state. As described above, because the grain diameter of the cleaning material 53 is between 0.01 millimeters and 10 millimeters and the specific gravity thereof is equal to or higher than that of the machining fluid 23, even when the cleaning material 53 is present in the machining fluid 23, the cleaning material 53 is not turned into gel, slurry, or sludge. As a result, the machining fluid 23 does not impair the flowability, and the cleaning material 53 is not suspended in the machining fluid 23.

In the configuration shown in FIG. 1, because the cleaning unit 50 is arranged on the pipe 42 on the subsequent stage (a downstream side) of the discharge valve 43 via the joints 52, the cleaning unit 50 is detachable arbitrarily when the machining fluid 23 does not flow in the pipe 42.

When being supplied to the machining tank 22, or by passing through the channel of the machining fluid 23 and the supply pump 61, the machining fluid 23 comes in contact with water and oxygen in the air. By a long-term use, water and oxygen are continuously taken into the machining fluid 23, thereby deteriorating the machining fluid 23. Deterioration of the machining fluid 23 has been heretofore judged by the operator on the basis of the hue change of the machining fluid 23 supplied to the machining tank 22 or viscosity when the operator touches the machining fluid 23, and replacement of the total amount or additional supply of new machining fluid 23 has been performed.

With respect to such circumstances, according to the first embodiment, the cleaning unit 50, in which the cleaning material 53 made of a porous material having a grain diameter between about 0.01 millimeters and 10 millimeters and a specific gravity equal to or higher than that of the machining fluid 23 is arranged, is provided on the pipe 42 connecting the machining tank 22 and the machining-fluid storage tank 71 of the electrical-discharge machining device. Accordingly, the flowing machining fluid 23 positively comes in contact with the cleaning unit 50 to cause dehydration, deoxidization, and decoloration of the machining fluid 23. Therefore, an effect is obtained where the machining fluid 23 can be cleaned efficiently. Further, by optimizing the specific gravity and the grain size of the cleaning material 53 in accordance with the machining fluid 23, even when the machining fluid 23 is brought into contact with the cleaning unit 50, the cleaning material 53 is not turned into gel, slurry, or sludge. Accordingly, the flowability of the machining fluid 23 does not deteriorate, and the machining fluid 23 can be used when the next electrical discharge machining is performed. Because the cleaning material 53 is not suspended in the machining fluid 23, the cleaning material 53 does not enter the gap between the machining electrode 12 and the workpiece 24 during the electrical discharge machining.

Second Embodiment

Figure 3:
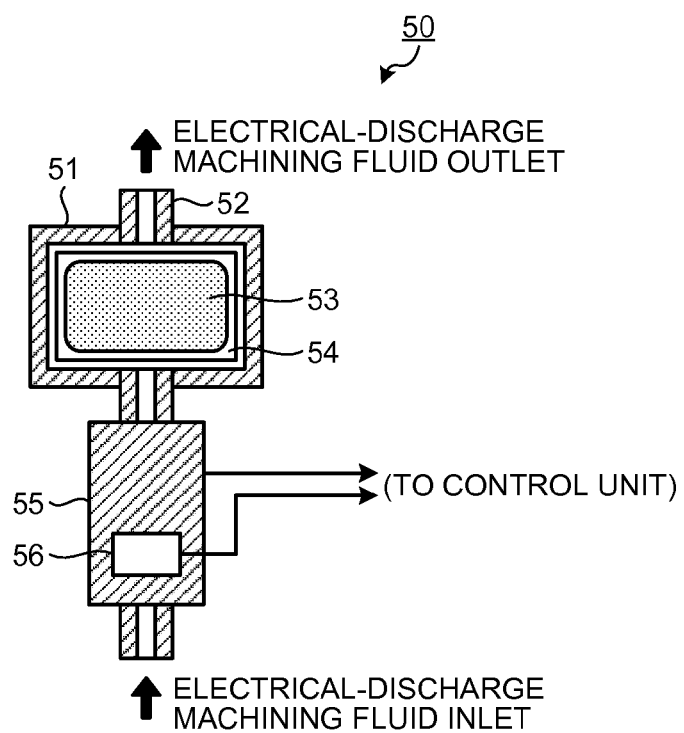
FIG. 3 is a diagram schematically showing an example of the configuration of a cleaning unit according to a second embodiment.

FIG. 3 is a diagram schematically showing an example of the configuration of a cleaning unit according to a second embodiment. The cleaning unit 50 is configured to further include, in the cleaning unit 50 according to the first embodiment, a flow-volume measuring unit 55 that measures the flow volume of the machining fluid 23 flowing in the cleaning unit 50 (the pipe 42) and a flow-volume display unit 56 that displays the flow volume measured by the flow-volume measuring unit 55. The flow-volume measuring unit 55 may be arranged on any of the upstream side and the downstream side in the direction in which the machining fluid 23 flows in the cleaning unit 50.

There is a limitation in the dehydration, deoxidization, and decoloration effect of the cleaning material 53. Therefore, for example, the total passage amount of the machining fluid 23 flowing through the cleaning material 53 for determining that the cleaning material 53 reaches the end of its life is defined beforehand as a cleaning-material replacement reference value. It is determined that the cleaning material 53 reaches the end of its life when the total passage amount of the machining fluid 23 obtained by accumulating the flow volume measured by the flow-volume measuring unit 55 has reached the cleaning-material replacement reference value. Therefore, the flow-volume display unit 56 has a function of accumulating and displaying the flow volume of the machining fluid 23 having passed through the cleaning unit 50 from the time point when the new cleaning material 53 is arranged in the cleaning unit 50. When the operator checks the flow-volume display unit 56 and recognizes that the total passage amount has exceeded the reference value, the cleaning material 53 in the cleaning unit 50 is replaced.

The flow-volume display unit 56 may have an alarm function of beeping or emitting light so as to attract the attention of the operator when the total passage amount measured by the flow-volume measuring unit 55 exceeds the cleaning-material replacement reference value. The configuration may be such that the flow-volume measuring unit 55 and the flow-volume display unit 56 are connected to the control unit 32, the flow volume measured by the flow-volume measuring unit 55 is accumulated by the control unit 32 to calculate the total passage amount, and the value is displayed on the flow-volume display unit 56 and is further notified to the operator when the total passage amount exceeds the cleaning-material replacement reference value. The cleaning-material replacement reference value may be defined beforehand according to the type and the grain diameter of the material of the cleaning material 53, and a cleaning-material replacement reference value may be set to correspond to the type of the cleaning material 53 stored in the cleaning unit 50.

According to the second embodiment, the flow-volume measuring unit 55 that measures the total passage amount of the machining fluid 23 having flowed after the cleaning unit 50 is filled with the new cleaning material 53 and the flow-volume display unit 56 that displays the total passage amount of the machining fluid 23 are provided; therefore, an effect is obtained where it is easily to know the time for replacement of the cleaning material 53.

Third Embodiment

Figure 4:
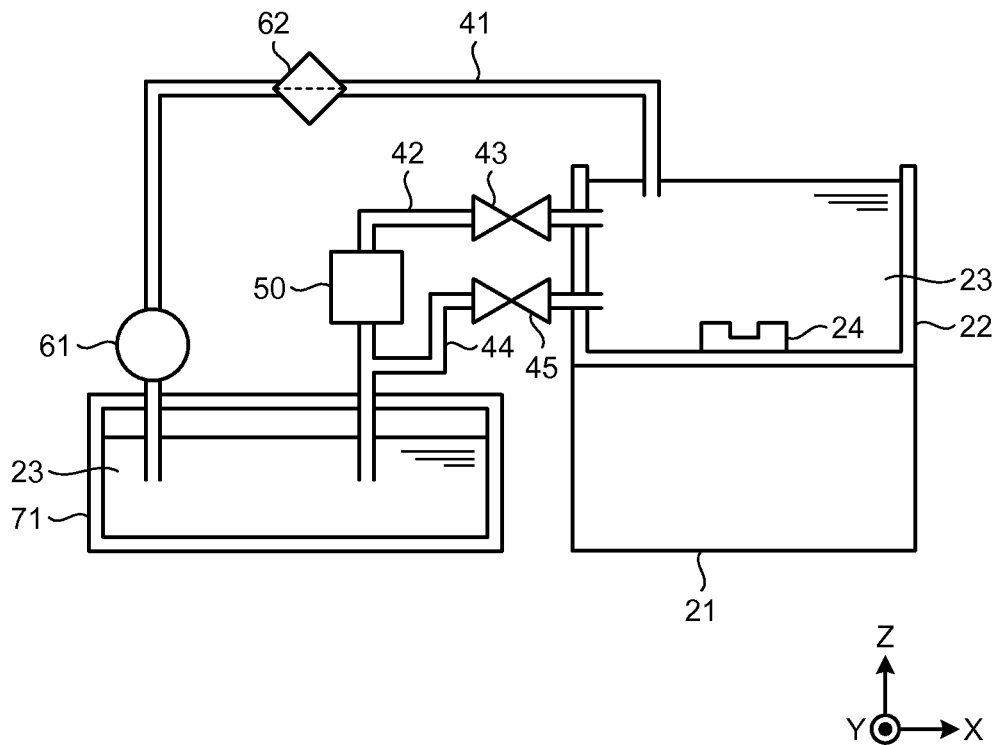
FIG. 4 is a diagram schematically showing an example of the configuration of an electrical-discharge machining device including a cleaning device for electrical-discharge machining fluid according to a third embodiment.

FIG. 4 is a diagram schematically showing an example of the configuration of an electrical-discharge machining device including a cleaning device for electrical-discharge machining fluid according to a third embodiment. In FIG. 4 and thereafter, illustration on the side of the electrical-discharge machining device is omitted. The electrical-discharge machining device is configured to further include a pipe 44 connecting the machining tank 22 and the pipe 42 on the downstream side of the cleaning unit 50 in addition to the pipe 42 on the discharge side that connects the machining tank 22 and the machining-fluid storage tank 71. A discharge valve 45 is provided on the pipe 44. Constituent elements identical to those according to the first embodiment are denoted by like reference signs and explanations thereof will be omitted. As for the cleaning unit 50, a cleaning unit with the configuration according to the second embodiment may be provided.

The electrical-discharge machining device according to the third embodiment is provided with a channel passing through the cleaning unit 50 and a channel not passing through the cleaning unit 50, in order to avoid the machining fluid 23 from always flowing into the cleaning unit 50 when the machining fluid 23 is to be discharged to the machining-fluid storage tank 71, and has a function of switching the discharge channel of the machining fluid 23 at an arbitrary timing. According to this configuration, when opening/closing of the two discharge valves 43 and 45 is controlled by the control unit 32 such that the discharge valve 43 is switched to the "open" state and the discharge valve 45 is switched to the "closed" state as required, the machining fluid 23 can pass through the cleaning unit 50. When the discharge valve 43 is switched to the "closed" state and the discharge valve 45 is switched to the "open" state, the machining fluid 23 can be returned to the machining-fluid storage tank 71 without passing through the cleaning unit 50. For example, a solenoid valve that can be controlled by the control unit 32 can be used as the discharge valves 43 and 45.

In FIG. 4, a configuration in which the control unit 32 controls opening/closing of the two discharge valves 43 and 45 has been explained. However, such a configuration can be adopted that the pipe 42 is branched into another channel on the upstream side of the cleaning unit 50 and converges again on the downstream side of the cleaning unit 50, and a three-way valve is arranged at a bifurcation area on the upstream side. In this case, the channel through which the machining fluid 23 is discharged from the machining tank 22 to the machining-fluid storage tank 71 can be arbitrarily changed by operating the three-way valve manually or automatically.

According to the third embodiment, as the flow channel through which the machining fluid 23 is discharged from the machining tank 22 to the machining-fluid storage tank 71, the pipe 42 passing through the cleaning unit 50 and the pipe 44 not passing through the cleaning unit 50 are provided, and the discharge valves 43 and 45 are respectively provided on the pipes 42 and 44. Accordingly, the cleaning unit 50 once arranged on the pipe 42 can be left as it is on the pipe 42 until the cleaning material 53 reaches the end of the set lifetime. As a result, in the third embodiment, it is not necessary to perform work, such as appropriately detaching the cleaning unit 50, which is required in the structure of the first embodiment.

Fourth Embodiment

Figure 5:
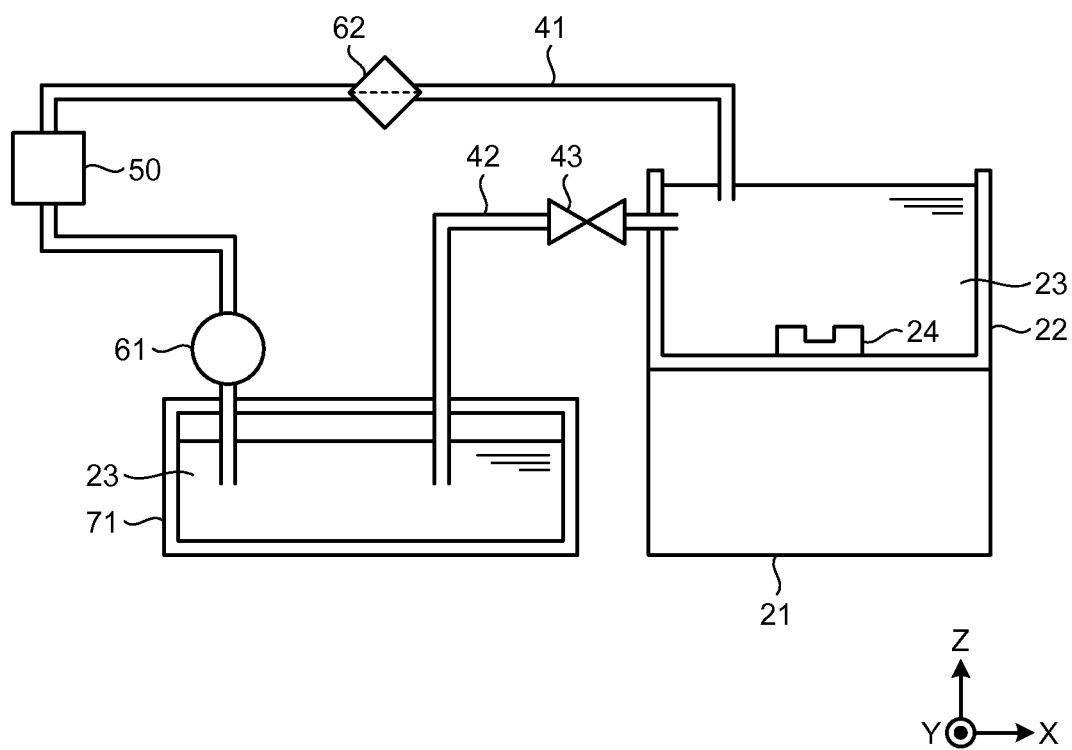
FIG. 5 is a diagram schematically showing an example of the configuration of an electrical-discharge machining device including a cleaning device for electrical-discharge machining fluid according to a fourth embodiment.

FIG. 5 is a diagram schematically showing an example of the configuration of an electrical-discharge machining device including a cleaning device for electrical-discharge machining fluid according to a fourth embodiment. In the first to third embodiments described above, the cleaning unit 50 is provided on the flow channel (the pipe 42) through which the machining fluid 23 is discharged from the machining tank 22 to the machining-fluid storage tank 71. However, in the fourth embodiment, the cleaning unit 50 is provided on the flow channel (the pipe 41) through which the machining fluid 23 is supplied from the machining-fluid storage tank 71 to the machining tank 22. Therefore, in this configuration, when the machining fluid 23 is supplied to the machining tank 22 by the supply pump 61, the machining fluid 23 always passes through the cleaning unit 50. The cleaning unit 50 may have an arbitrarily detachable configuration by arranging the cleaning unit 50 via a joint on the near side of (the upstream side of) the filter unit 62 on the pipe 41, or may have a configuration in which the cleaning-material holding container 54 is arbitrarily detachable by providing the opening/closing door 51a in the housing 51 as shown in FIG. 2. Constituent elements identical to those according to the first embodiment are denoted by like reference signs and explanations thereof will be omitted. As for the cleaning unit 50, a cleaning unit with the configuration according to the second embodiment may be provided.

As shown in FIGS. 1 and 4, in the electrical-discharge machining device provided with the cleaning unit 50 on the discharge-side pipe 42 for discharging the machining fluid from the machining tank 22, when by any chance the cleaning material 53 flows out of the cleaning unit 50, the cleaning material 53 enters the supply pump 61. As a result, the cleaning material 53 having a hardness may cause damage on the constituent component of the supply pump 61. In contrast, according to the fourth embodiment, the cleaning unit 50 is provided between the supply pump 61 and the filter unit 62 on the supply-side pipe 41 for supplying the machining fluid to the machining tank 22; therefore, an effect is obtained where even when the cleaning material 53 flows out, the cleaning material 53 is prevented from entering the supply pump 61 and the cleaning material 53 does not cause damage on the constituent components of the supply pump 61.

Because the cleaning material 53 that has flowed out is removed by the filter unit 62, the cleaning material 53 does not diffuse in the machining tank 22. As a result, the cleaning material 53 is prevented from entering the gap between the machining electrode 12 and the workpiece 24 during the electrical discharge machining, and the machining quality does not deteriorate.

Fifth Embodiment

FIG. 6 is a diagram schematically showing an example of the configuration of an electrical-discharge machining device including a cleaning device for electrical-discharge machining fluid according to a fifth embodiment. The configuration is different from the configuration shown in FIG. 5 in that there are two flow channels between the supply pump 61 and the filter unit 62, and one of the flow channels is constituted by the pipe 41 provided with the cleaning unit 50 and a supply valve 46 and the other of the flow channels is constituted by a pipe 47 provided with only a supply valve 48. Constituent elements identical to those according to the first embodiment are denoted by like reference signs and explanations thereof will be omitted. As for the cleaning unit 50, a cleaning unit with the configuration according to the second embodiment may be provided.

In the configuration shown in FIG. 6, when the control unit 32 controls the two supply valves 46 and 48 such that the supply valve 48 is switched to the "closed" state and the supply valve 46 is switched to the "open" state as required, the machining fluid 23 can pass through the cleaning unit 50. When the supply valve 48 is switched to the "open" state and the supply valve 46 is switched to the "closed" state, the machining fluid 23 can be supplied to the machining tank 22 without passing through the cleaning unit 50. For example, a solenoid valve that can be controlled by the control unit 32 can be used as the supply valves 46 and 48.

In FIG. 6, a configuration in which the control unit 32 controls the two supply valves 46 and 48 has been explained. However, by arranging a three-way valve at a bifurcation area on the supply channel from the supply pump 61 and operating the three-way valve manually or automatically, the channel through which the machining fluid 23 is supplied from the machining-fluid storage tank 71 to the machining tank 22 can be arbitrarily changed.

According to the fifth embodiment, the cleaning unit 50 once arranged on the pipe 41 can be left as it is on the pipe 41 until the cleaning material 53 reaches the end of the set lifetime. As a result, in the fifth embodiment, it is not necessary to perform work, such as appropriately detaching the cleaning unit 50, which is required in the structure of the fourth embodiment. Further, such a state that when the supply pump 61 is operated, the machining fluid 23 always flows into the cleaning unit 50 can be avoided.

In FIGS. 1, 4, 5, and 6 of the first to fifth embodiments described above, an explanation has been given of the configuration in which the machining fluid 23 supplied by the supply pump 61 is filtered by the filter unit 62 and the machining debris generated during the electrical discharge machining is removed. However, for example, even in a structure provided with a contaminated fluid tank into which the machining fluid 23 containing the machining debris discharged from the machining tank 22 flows in the machining-fluid storage tank 71 and a clean fluid tank into which the machining fluid 23 filtered by the filter unit 62 flows via a filter pump that supplies the machining fluid 23 from the contaminated fluid tank to the filter unit 62, the cleaning unit 50 may be arranged on an appropriately formed channel of the machining fluid 23. Further, these embodiments do not necessarily need to have the configurations shown in FIGS. 1, 4, 5, and 6. For example, because the cleaning material 53 works effectively without providing the cleaning unit 50, the cleaning material 53 may be provided solely. Further, the first to third embodiments show a case where the cleaning unit 50 is provided on the pipe 42 on the discharge side, and the fourth and fifth embodiments show a case where the cleaning unit 50 is provided on the pipe 41 on the supply side. However, the configuration may be such that the cleaning unit 50 is provided both on the pipe 41 on the supply side and on the pipe 42 on the discharge side.

An explanation will be given here of examples in which the machining fluid 23 is cleaned by the cleaning device for electrical-discharge machining fluid according to the above embodiments.

FIG. 7 is a diagram showing test conditions used in the examples. As the cleaning material 53, activated carbon having a grain size between 0.2 millimeters and 0.5 millimeters and a specific gravity between 1.8 and 2.5, and activated white earth having a grain size between 0.2 millimeters and 0.8 millimeters and a specific gravity of 2.4 are used. The total amount of the machining fluid 23 is 200 liters, and the used amount of the cleaning material 53 is 10 kilograms. The cleaning device for electrical-discharge machining fluid (the cleaning unit 50) shown in FIG. 5 according to the fourth embodiment is used to cause the machining fluid to pass therethrough for 24, 120, 360, and 720 hours to perform a cleaning process. A case where the process is performed for 720 hours by using activated carbon as the cleaning material 53 is shown as Example 1, a case where the process is performed for 24 hours by using activated white earth as the cleaning material 53 is shown as Example 2, and a case where the process is performed for 120 hours by using activated white earth as the cleaning material 53 is shown as Example 3.

The color (Saybolt) of the machining fluid 23 before cleaning is −16 by evaluation according to JIS-K-2580, the density is 0.806 g/cm$^3$ by evaluation according to JIS-K-2249, the viscosity at 40° C. is 4.0 mm$^2$/s by evaluation according to JIS-K-2283, the water is less than 0.03 mass % by evaluation according to JIS-K-2275, the acid value is 0.02 mgKOH/g by evaluation according to JIS-K-2501, and the degree of contamination is 0.2 mg/100 ml by evaluation according to JIS-B-9931.

FIG. 8 is a diagram showing characteristics of new oil, machining fluid before cleaning, and machining fluid after being subjected to a cleaning process in Examples 1 to 3. FIG. 8 shows characteristic values of the new oil before being used for the electrical discharge machining, characteristic values of the machining fluid 23 before the cleaning process, characteristic values of the machining fluid 23 after being subjected to the cleaning process for 720 hours in Example 1, characteristic values of the machining fluid 23 after being subjected to the cleaning process for 24 hours in Example 2, and characteristic values of the machining fluid 23 after being subjected to the cleaning process for 120 hours in Example 3. It is understood that the machining fluid 23 before cleaning has deteriorated as compared with the new oil in any of the color, density, viscosity, water, acid value, and degree of contamination.

As shown in Example 1, when the machining fluid 23 before cleaning is cleaned by activated carbon for 720 hours, slight improvement can be seen in the density, acid value, and degree of contamination, although there is no change in the color and water. When the machining fluid 23 before cleaning is cleaned by activated white earth for 24 hours as shown in Example 2 and when the machining fluid 23 before cleaning is cleaned by activated white earth for 120 hours as shown in Example 3, slight improvement can be seen in the density, acid value, and degree of contamination and significant improvement is seen in the color, although there is no change in the water.

From FIG. 8, it is understood that activated white earth is better than activated carbon as the cleaning material 53, and in order to clean 200 liters of the machining fluid 23 by using activated white earth, the machining fluid 23 can be cleaned by performing the cleaning process for one day (24 hours) to the same level as that when the cleaning process is performed for five days (120 hours). In other words, when 200 liters of the machining fluid 23 is to be cleaned by using activated white earth, even when the cleaning process is performed for more than one day, the characteristics of the machining fluid 23 are not largely improved. Particularly, the color of the machining fluid 23 before cleaning is red, but is improved to almost colorless and transparent in 24 hours by the cleaning using activated white earth as the cleaning material 53. Regarding the water, it seems that the machining fluid 23 does not contain water in the first place; however, the acid value and degree of contamination are both reduced to half. Accordingly, it is understood that the machining fluid 23 has been cleaned.

An electrical-discharge machining test is further performed by performing rib machining and best surface machining on a steel material, which is the workpiece 24, by using the machining fluid 23 before cleaning and the machining fluid 23 after being cleaned in Example 2 and using a copper electrode as the machining electrode 12. The rib machining is performed by performing machining to a machining depth of 20 millimeters using a rib electrode having a width of 20 millimeters and a thickness of 1 millimeter. The best surface machining is performed by performing finish machining to obtain the best surface using an electrode of 10 millimeters×10 millimeters.

FIG. 9 is a diagram showing the results of the electrical-discharge machining test performed by using the machining fluid before cleaning and the machining fluid after being subjected to the cleaning process in Example 2. As shown in FIG. 9, a large change was not seen in surface roughness (ten-point average roughness) before and after the cleaning process. However, so-called "surface irregularities", which are the unevenness of the surface texture frequently seen when the oil-based machining fluid 23 is deteriorated, have been considerably improved after cleaning. This phenomenon occurs when deterioration of the oil-based machining fluid 23 proceeds to spoil the recovery effect of electrical discharge insulation, and electrical discharge becomes hard to diffuse, and a black spot and adhesion of tar are partially seen. However, in the cleaned machining fluid 23, it is confirmed that the phenomenon has been improved.

In the rib machining in which the machining depth becomes deep with respect to the bottom area of the electrode, machining debris becomes difficult to discharge, and it is said that the most significant concern is a decrease in the machining speed due to impairment of the insulation recovery effect as a result of deterioration of the oil-based machining fluid 23. In practice, as shown in FIG. 8, it is understood that when machining is performed by using the cleaned machining fluid 23, the machining time can be improved by about 20% as compared with the machining time before cleaning.

In the test using activated white earth as the cleaning material 53, the degree of improvement of hue change decreases when the cleaning process of the machining fluid 23 performed for 120 hours shown in Example 3 in FIG. 7 is repeated four times. From this fact, it is understood that 10 kilograms of activated white earth has a lifetime long enough to clean 200 liters of the oil-based machining fluid 23 for 480 hours.

Furthermore, according to the configuration shown in FIG. 5, the cleaning material 53 does not enter the machining tank 22 or the machining-fluid storage tank 71, an alarm indicating an insufficient supply of the machining fluid 23 per unit time due to deterioration of the flowability of the machining fluid 23 is not issued, and excellent cleaning is performed.

As described above, when deterioration proceeds due to the long-term use of the machining fluid 23 and electrical-discharge machining characteristics degrade, the machining fluid 23 can be improved such that it has properties close to those of new oil and the electrical discharge machining performance can be also recovered by performing cleaning according to the above embodiments. As a result, an effect is obtained where the life of new oil can be extended and thus the processing cost in the electrical-discharge machining process can be reduced.

INDUSTRIAL APPLICABILITY

As described above, the cleaning device for electrical-discharge machining fluid according to the present invention is useful for cleaning oil-based electrical-discharge machining fluid used in an electrical-discharge machining process.

REFERENCE SIGNS LIST 11 main shaft
12 machining electrode
21 worktable
22 machining tank
23 machining fluid
24 workpiece
31 power source
32 control unit
41, 42, 44, 47 pipe
43, 45 discharge valve
46, 48 supply valve
50 cleaning unit
51 housing
51a opening/closing door
52 joint
53 cleaning material
54 cleaning-material holding container
55 flow-volume measuring unit
56 flow-volume display unit
61 supply pump
62 filter unit
71 machining-fluid storage tank

The invention claimed is:

1. A cleaning device for electrical-discharge machining fluid that cleans electrical-discharge machining fluid of an electrical-discharge machining device including a machining tank that is filled with oil-based electrical-discharge machining fluid and in which a workpiece is machined by applying a pulse voltage between the workpiece and a machining electrode and a machining-fluid storage tank that stores the electrical-discharge machining fluid to be used in the machining tank, the cleaning device comprising:
    a cleaning-material storage container in a flow channel that causes the electrical-discharge machining fluid to flow between the machining tank and the machining-fluid storage tank, the cleaning-material storage container storing a cleaning material, which is made of a granular porous material, which has a specific gravity equal to or higher than that of the electrical-discharge machining fluid and a grain diameter between 0.01 millimeters and 10 millimeters and with which dehydration, deoxidation, and decoloration are performed on the oil-based electrical-discharge machining fluid;
    a switching unit that switches whether to cause the electrical-discharge machining fluid to flow via the flow channel; and
    a control unit that controls switching of the switching unit, wherein
    for the oil-based electrical-discharge machining fluid whose hue has changed due to use, the control unit controls the switching unit such that the electrical-discharge machining fluid is cleaned in the cleaning-material storage container by causing the electrical-discharge machining fluid to flow into the flow channel at a predetermined timing at which an electrical-discharge machining process is not being performed by the electrical-discharge machining device, and
    a grain diameter of the cleaning material is selected between 0.01 millimeters and 10 millimeters such that a grain diameter of the cleaning material and a grain diameter of machining debris generated depending on a type of electrical discharge machining performed by the electrical-discharge machining device have a difference of double or more.

2. The cleaning device for electrical-discharge machining fluid according to claim 1, wherein the cleaning-material storage container is constituted by a mesh bag or container where the mesh has a diameter smaller than the grain diameter of the cleaning material.

3. The cleaning device for electrical-discharge machining fluid according to claim 1, further comprising:
    a housing that houses the cleaning-material storage container; and
    a pipe-like joint that is provided to the housing and is detachable from a pipe connecting the machining tank and the machining-fluid storage tank.

4. The cleaning device for electrical-discharge machining fluid according to claim 1, further comprising a housing that houses the cleaning-material storage container and is fixed to a pipe connecting the machining tank and the machining-fluid storage tank, wherein
the housing includes an opening/closing door from which the cleaning-material storage container is taken in and out.

5. The cleaning device for electrical-discharge machining fluid according to claim 3, wherein
the pipe has a first channel in which the housing is arranged and a second channel that bypasses the housing, and
the cleaning device further includes a switching unit that causes the electrical-discharge machining fluid to flow to either the first channel or the second channel.

6. The cleaning device for electrical-discharge machining fluid according to claim 1, further comprising:
a flow-volume measuring unit that measures a total passage amount, which is a total amount of the electrical-discharge machining fluid flowing in the cleaning-material storage container, after a new cleaning material is arranged in the cleaning-material storage container; and
a total-passage-amount display unit that displays the total passage amount.

7. The cleaning device for electrical-discharge machining fluid according to claim 6, further comprising a control unit that gives a notice to prompt replacement of the cleaning material in a case where a value displayed on the total-passage-amount display unit exceeds a cleaning-material replacement reference value, which is a flow volume of the electrical-discharge machining fluid passing through the cleaning material when the cleaning material reaches an end of life.

8. The cleaning device for electrical-discharge machining fluid according to claim 1, wherein the cleaning-material storage container is provided on a discharge-side pipe through which the electrical-discharge machining fluid is discharged from the machining tank to the machining-fluid storage tank.

9. The cleaning device for electrical-discharge machining fluid according to claim 1, wherein the cleaning-material storage container is arranged between a supply pump that pumps up the electrical-discharge machining fluid in the machining-fluid storage tank and a filter unit that removes machining debris in the electrical-discharge machining fluid, the supply pump and the filter unit being on a supply-side pipe through which the electrical-discharge machining fluid is supplied from the machining-fluid storage tank to the machining tank.

10. A cleaning method for electrical-discharge machining fluid that cleans electrical-discharge machining fluid of an electrical-discharge machining device including a machining tank that is filled with oil-based electrical-discharge machining fluid and in which a workpiece is machined by applying a pulse voltage between the workpiece and a machining electrode and a machining-fluid storage tank that stores the electrical-discharge machining fluid to be used in the machining tank, the cleaning method comprising:
causing a cleaning material to come into contact with the electrical-discharge machining fluid by causing the electrical-discharge machining fluid whose hue has changed due to use to flow in a flow channel that causes the electrical-discharge machining fluid to flow between the machining tank and the machining-fluid storage tank at a predetermined timing at which an electrical-discharge machining process is not being performed by the electrical-discharge machining device, the cleaning material being provided on the flow channel and being made of a granular porous material, which has a specific gravity equal to or higher than that of the electrical-discharge machining fluid and a grain diameter between 0.01 millimeters and 10 millimeters and with which dehydration, deoxidation, and decoloration are performed on the oil-based electrical-discharge machining fluid; and
selecting a grain diameter of the cleaning material between 0.01 millimeters and 10 millimeters such that a grain diameter of the cleaning material and a grain diameter of machining debris generated depending on a type of electrical discharge machining performed by the electrical-discharge machining device have a difference of double or more.

11. The cleaning device for electrical-discharge machining fluid according to claim 4, wherein
the pipe has a first channel in which the housing is arranged and a second channel that bypasses the housing, and
the cleaning device further includes a switching unit that causes the electrical-discharge machining fluid to flow to either the first channel or the second channel.

\* \* \* \* \*